United States Patent [19]

Kubo et al.

[11] 4,088,156

[45] May 9, 1978

[54] FLEXIBLE CONDUIT ASSEMBLY

[75] Inventors: Shinsuke Kubo, Osaka; Hiroyuki Kuzunishi, Nagoya, both of Japan

[73] Assignees: Oiles Industry Co., Ltd., Tokyo; Chuo Spring Co., Ltd., Nagoya, both of Japan

[21] Appl. No.: 710,804

[22] Filed: Aug. 2, 1976

[30] Foreign Application Priority Data

May 7, 1976 Japan .................................. 51-51339
May 7, 1976 Japan ............................. 51-56651[U]

[51] Int. Cl.² .............................................. F16C 1/10
[52] U.S. Cl. .................................. 138/109; 74/501 P; 74/502; 264/274
[58] Field of Search ...................... 138/109, 133; 64/3; 74/501 P, 502; 264/274; 285/149, 284

[56] References Cited

U.S. PATENT DOCUMENTS

| | | | |
|---|---|---|---|
| 2,787,917 | 4/1957 | Schroeder | 74/501 P |
| 3,120,401 | 2/1964 | Brown | 285/284 |
| 3,263,519 | 8/1966 | Conrad | 138/109 |
| 3,263,520 | 8/1966 | Tschanz | 138/109 |
| 3,354,742 | 11/1967 | Tschanz et al. | 138/109 |
| 3,435,107 | 3/1969 | Conrad | 264/274 |
| 3,443,452 | 5/1969 | Shontz | 74/502 |

*Primary Examiner*—Henry K. Artis
*Assistant Examiner*—Richard R. Stearns

[57] ABSTRACT

An improved flexible conduit assembly comprising a flexible conduit including an inner tube of synthetic resin, a plurality of wires wound helically about the inner tube, an outer casing enclosing the wires and the inner tube and a motion-transmitting wire core element, and an improved holder wherein a resilient and plato-resistant end anchor obtained by reversely bending the wires is embedded by injection molding synthetic resin against an end of the conduit, thereby making possible remarkably strong resistance against a pulling force.

1 Claim, 11 Drawing Figures

FLEXIBLE CONDUIT ASSEMBLY

The present invention relates to an improved, flexible conduit assembly, and more specifically, to the conduit assembly of the type which includes an axially extending flexible conduit having an inner tube made of synthetic resinous material, a plurality of axial load-bearing wires wound axially and helically about the inner tube on a long lead, a tubular outer casing made of synthetic resinous material enclosing the wires and the inner tube, a flexible motion-transmitting wire core element supported within and extending through the bore of the inner tube, and a holder made of synthetic resinous material injection molded about the end of the conduit.

Flexible conduit assemblies of the type described are well known in their own particular field, and are commonly used, for example, as remote control means in automobiles, bicycles and other industrial equipments.

For detailed description of conventional flexible conduit assemblies of the type described, reference is made to FIGS. 1-5 of the accompanying drawings.

The strength and flexibility of the conduit A with respect to the axial and diametrical directions can be suitably adjusted for each purpose by changing the diameter, number and lead of the steel wires, said strength and flexibility being one of the requirements of the conduit A.

Said plurality of helically wound steel wires 2 are covered with an outer casing 3, which is formed from synthetic resin such as polypropylene, polyethylene, polyamide, vinyl chloride or the like. Numeral 4 designates a flexible motion-transmitting wire core element disposed within the inner tube 1 for freely slidable movement.

In order to mount one end of said flexible conduit on a fixed support structure, the outer casing 3 is supposed to be provided at the corresponding end with a holder or a cap.

Figure 5:
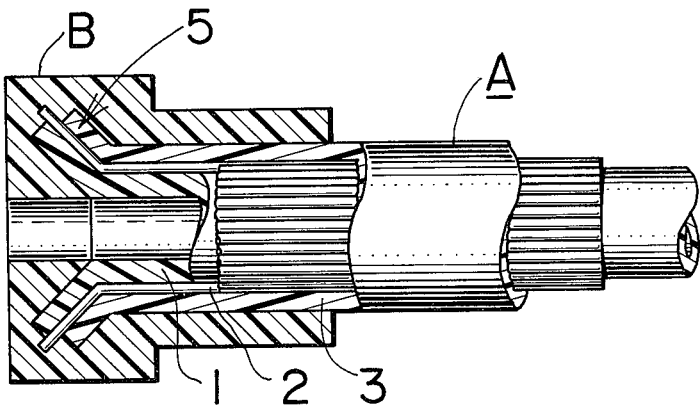

A well-known method for securing the holder to the outer casing 3 comprises bending the inner tube 1, the plurality of helically wound steel wires 2 and the outer casing 3 radially outwardly from their common axis at an end of the flexible conduit A, and injection molding the synthetic resin against said end of the conduit A to form a holder B, thereby permitting said end of the conduit to be secured to the holder B while said core element is moved relative to the conduit, as best seen in FIG. 5.

It is appreciated that conventional conduit assemblies of the type described are easy and inexpensive to manufacture. A serious disadvantage with this type of flexible conduit assembly, however, is that the holder B quite often tends to be removed away from the outer casing 3, upon repeated using of the conduit assemblies especially for transmitting pull-push motion.

Therefore, it is an object of the present invention to provide an improvement in the bonded connection between a holder and a conduit in a conduit assembly of the type described.

It is another object of the present invention to provide an improved, relatively simple method for manufacturing a flexible conduit assembly.

In brief, these objects are accomplished in accordance with the present invention by a resilient and plasto-resistant end anchor including the end portions of the wires exposed by peeling off the subject portion of the casing and being bent in the reverse direction along the length of the casing at an end of the conduit having an end portion of the inner tube cut in an appropriate length, and a holder made of synthetic resinous material injection molded about the end of the conduit for embedding the end portions of the wires in the holder to form the end anchor for preventing relative axial movement between the conduit and the holder.

Figure 1:
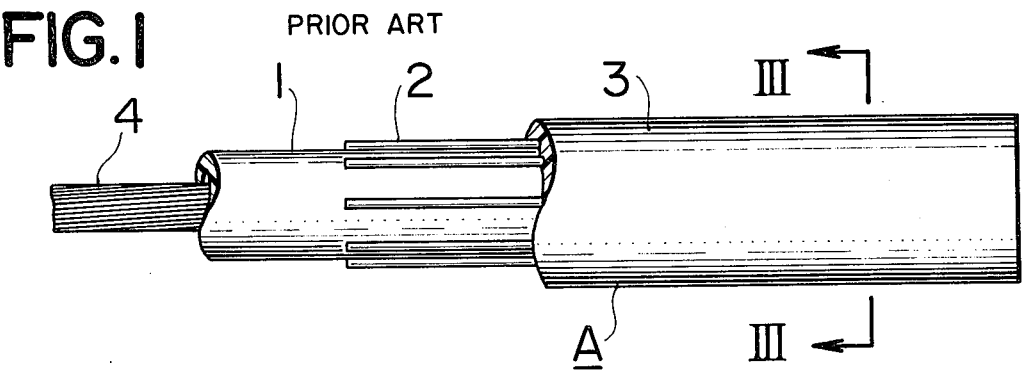
FIG. 1 is a side view of a flexible conduit A of the type described.
Figure 2:
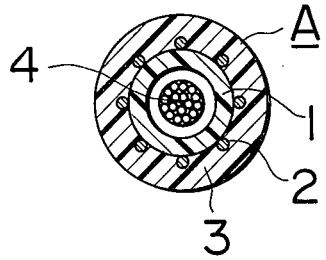
FIG. 2 is a transverse sectional view taken on a line III—III in FIG. 1, in both of which numeral 1 designates an inner tube made of synthetic resin having self-lubricative properties, such as polyacetal, polyamide, polyethylene or the like, and numeral 2 designates a plurality of steel wires helically wound on a suitable lead about said inner tube made of synthetic resin.
Figure 3:
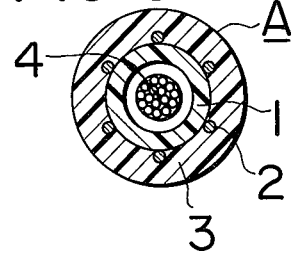
Figure 4:
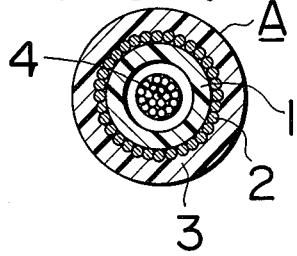
Figure 6:
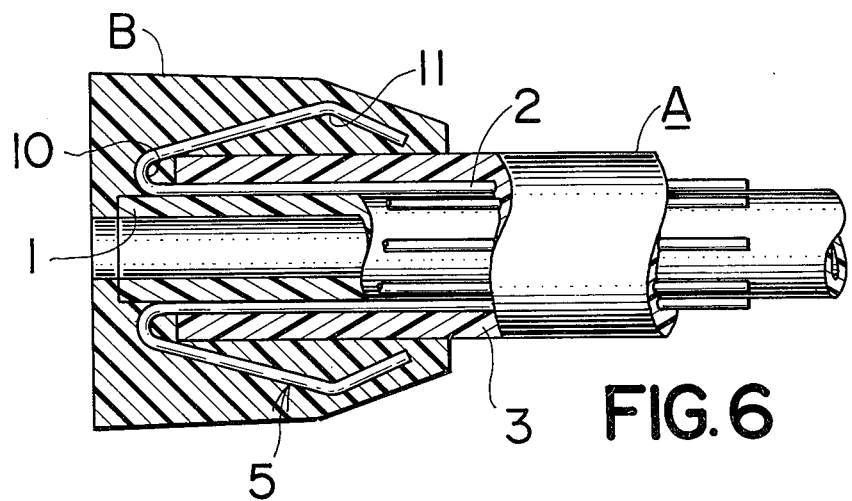
Figure 7:
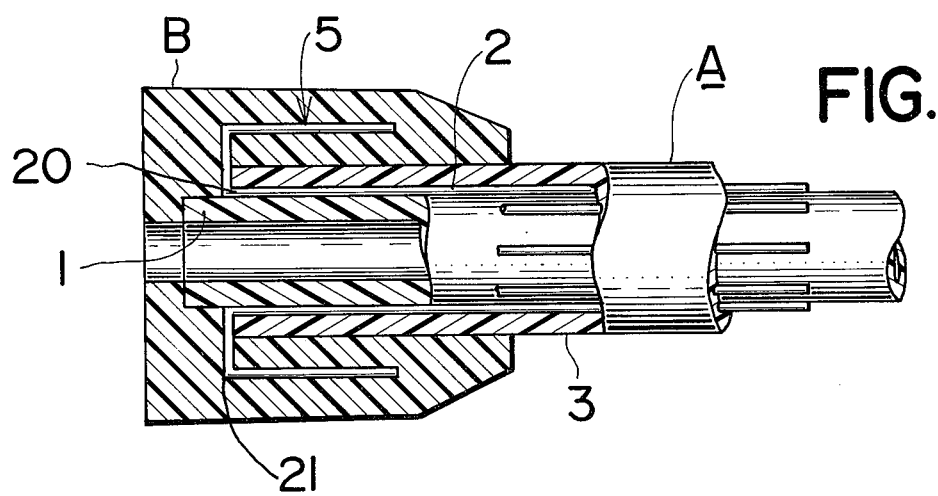

Other objects, features and advantages of the present invention will be more apparent from the following detailed description of preferred embodiments thereof made with reference to the accompanying drawings in which:

FIG. 1 is a partially cutaway side view of a flexible conduit of the well-known type;

FIG. 2 is a transverse sectional view of the conduit taken on a line III—III of FIG. 1, but on an enlarged scale;

FIGS. 3 and 4 are transverse sectional views of other examples of the flexible conduit;

FIG. 5 is a side view, partially in vertical section, showing the attachment between a conventional holder and the flexible conduit;

FIGS. 6 and 7 are side views, partially in section, showing the attachment between the flexible conduit and a holder according to the present invention;

FIGS. 8-11 are side views, partially in section and with parts broken away, of the flexible conduit in the course of a processing operation according to the present invention.

Referring now to FIG. 6, a flexible conduit A comprises an inner tube 1 made of synthetic resin, eight steel wires 2 helically wound on a long lead about the inner tube 1, and an outer casing 3 of synthetic resin enclosing said steel wires 2 and said inner tube 1. The outer casing 3 is peeled off at one end of the conduit A to expose the end portions 5 of the steel wires 2 helically wound about the inner tube 1. Each portion 5 of the steel wires thus exposed is bent reversely with respect to the conduit A so as to make an acute angle to the outer surface of the casing 3, thereby providing a first local plasto-resistant bend point, generally designated by numeral 10. Then, each of the exposed steel wires 5 is further bent at a point near its extremity so as to converge toward the axis of conduit A, thereby providing a second plasto-resistant bend point 11.

With the end portions 5 of the steel wires 2 bent in a manner described above to provide said first and second plasto-resistant bend points 10, 11, a holder B of synthetic resin is injection molded about the inner tube 1 of synthetic resin, the end portions 5 of the steel wires 2, and the outer casing 3 to embed the end portions 5 of the steel wires 2 therein, and is thereby firmly secured to the conduit A. The shape of the end portions 5 of the steel wires 2 embedded in the holder B, as shown in FIG. 6, will be hereinafter referred to as a triangular shape.

Referring to FIG. 7, the outer casing 3 is peeled off at one end of the conduit A the structure of which was described above, to expose the end portions 5 of the steel wires 2 helically wound about the inner tube 1 of synthetic resin. Each portion 5 of the steel wires 2 thus exposed is bent outwardly at a substantially right angle with respect to the conduit A to form a first local plasto-resistant bend point, generally designated by numeral 20. Then, the end portion 5 of each steel wire provided with the first plasto-resistant bend point 20 is further bent back substantially at a right angle so as to obtain a substantially rectangular shape, thereby providing a second plasto-resistant bend point 21.

Said end portions 5 of the steel wires are thereafter embedded in the holder B of synthetic resin by way of the injection molding operation in a manner identical to that described above with respect to FIG. 6 to provide a strong attachment between the holder B and the conduit A. The shape defined by the end portions 5 of the steel wires embeded in the holder B, as shown in FIG. 7, will be hereinafter referred to as a rectangular shape.

The method for manufacturing a conduit assembly according to the present invention will be described below in order of the processing operation, with respect to that shown in FIG. 6, by referring to FIGS. 8–11, in which the conduit A comprises the inner tube 1 of synthetic resin, the eight steel wires 2 helically wound about the inner tube 1 on a long lead, and the outer casing 3 of synthetic resin enclosing the steel wires 2 and the inner tube 1.

Figure 8:
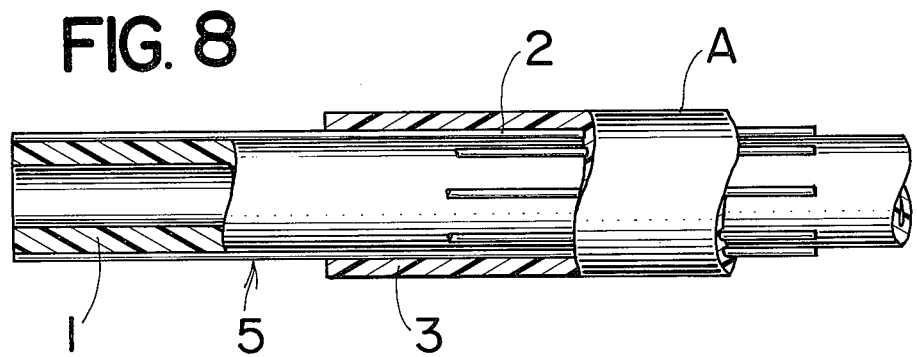

Step 1: The outer casing 3 of synthetic resin is peeled off at one end of the conduit A to expose the end portions 5 of the steel wires helically wound about the inner tube 1 of synthetic resin (FIG. 8).

Step 2: Each of the steel wires 2 thus exposed is bent reversely with respect to the conduit A so as to make an acute angle to the outer surface of the casing 3, thereby providing the first local plasto-resistant bend point 10.

Figure 9:
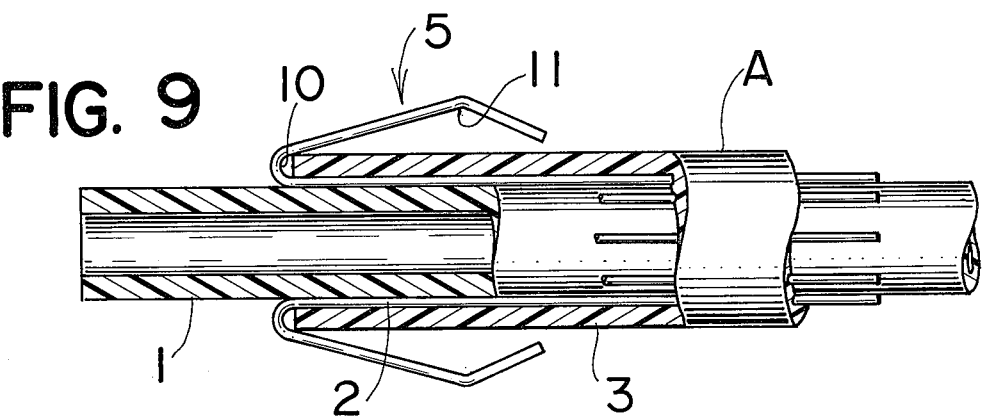

Then, each of the exposed steel wires is further bent at a point near its extremity so as to converge toward the axis of the conduit A, thereby providing the second plasto-resistant bend point 11 (FIG. 9).

Figure 10:
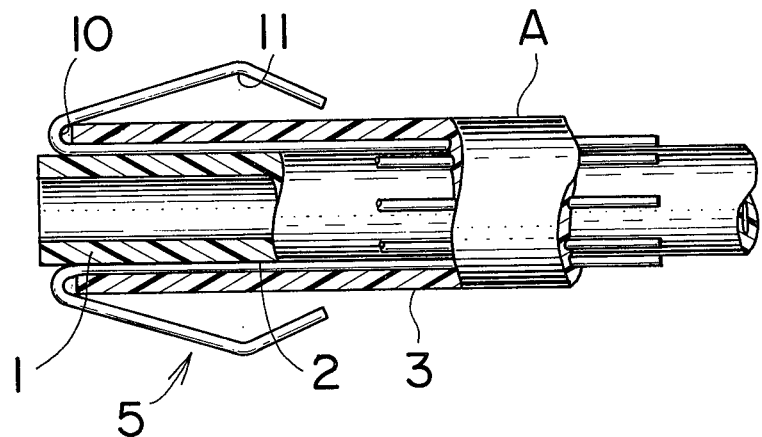

Step 3: With the exposed end portions 5 of the steel wires 2 each provided with the first and the second local plasto-resistant bend points 10, 11, the inner tube 1 of synthetic resin is cut-off in an appropriate length, which length can be determined suitably depending on the shape defined by the exposed end portions 5 of the steel wires 2 (FIG. 10).

Figure 11:
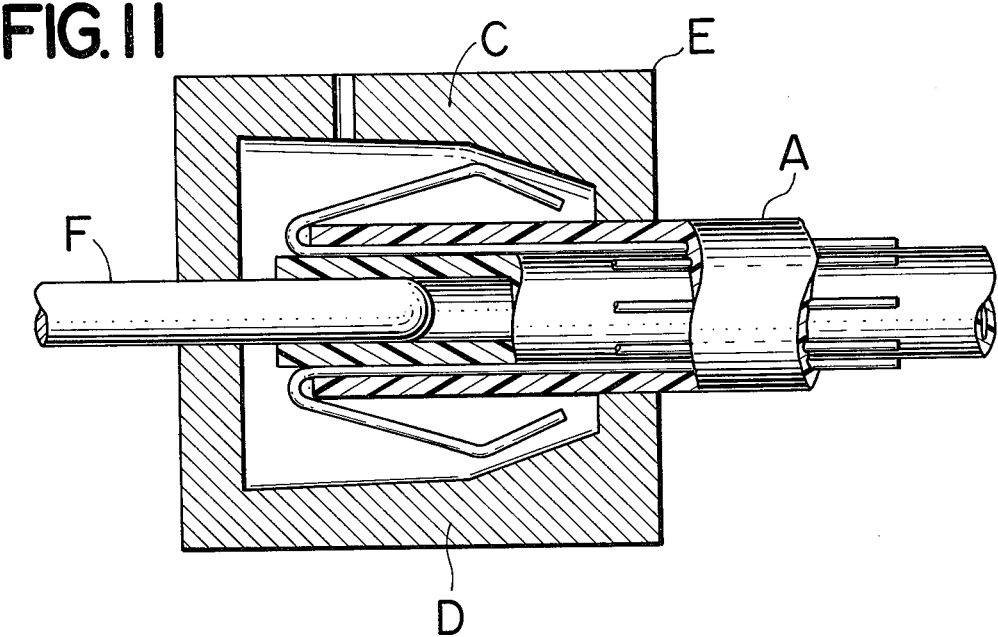

Step 4: The end of the conduit 4 thus obtained is placed in a metal mold E consisting of a cope C and a drag D. With the conduit A so positioned, a core bar F is slid into the inner tube 1, and thereafter a suitable synthetic resin is injected through an opening into the mold cavity to form the holder (FIG. 11).

The conduit assembly shown in FIG. 6 is manufactured in the four steps described above.

Further, the method for manufacturing the embodiment shown in FIG. 7 is the same as that described with respect to the embodiment shown in FIG. 6.

The conduit, used in the embodiment shown in FIGS. 6 and 7 is so constructed that eight steel wires 2 are helically wound about the inner tube 1 of synthetic resin, as shown in section in FIG. 2. The number of the steel wires 2, however, is not limited at all. For example, those conduits, the transverse sectional views of which are shown in FIGS. 3 and 4, respectively, may be also available for some applications.

Particularly, in case of using the conduit the transverse section of which is shown in FIG. 4, i.e., the conduit in which a full complement of steel wires 2 are helically wound about the inner tube 1 of synthetic resin, some of said plurality of exposed steel wires 2 are bent reversely to provide said local plasto-resistant bend points, while other exposed steel wires 2 being cut-off at each point abutting the outer casing, and thereafter the synthetic resin is injection molded against the end of the conduit to form the holder for firmly securing said conduit thereto. It is also possible to bend all of the closely wound exposed steel wires so as to provide said local plasto-resistant bend points and thereafter to injection mold the holder of synthetic resin about said bend points of the exposed steel wires. In this case, however, due to slight spacings between the adjacent steel wires, there is insufficient interposition of the synthetic resin between the adjacent steel wires, thereby resulting in the decreased strength of the holder.

Specific features of the present invention are as follows: The holder of synthetic resin is hardly adhered to the steel wires by injection molding the synthetic resin about the steel wires at the end of the conduit. Actually the former is not adhered to the latter at all. Therefore, the strength of the securement between the holder and the conduit depends on that of the mechanical interlock between the holder and the wires enclosed thereby.

For further detailed description, as a first step, the repeated application of a pulling force of moderate intensity to the conduit causes the end portions of the steel wires embedded in the holder to repeatedly undergo a slight sliding displacement. As a result of this repeated displacement, the bonded connection between the steel wires and the holder tends to become loose.

Further, as a second step, the application of the pulling force mentioned above, but above a predetermined intensity to the conduit causes said local plasto-resistant bend points to be moved along the steel wires in the holder of synthetic resin with each of the steel wires returning to its original straight line (plastic deformation of the steel wires), thereby effecting sliding movement of the steel wires embeded in the holder in the direction of application of said pulling force.

The force trying to return the embedded steel wires to their original straight lines with their bend points moving therealong serves as the critical resistance against said pulling force.

The resistance against said pulling force, i.e., the strength of the bonded connection between the conduit and the holder, greatly depends on the angle through which the end portions of the steel wires are bent to form the bend points, the number of the bend points, the shape defined by the end portions of the steel wires, and the distance between the last bend point and the extremity of each of the steel wires.

In view of the plasto-mechanical situation which would take place in the holder of synthetic resin upon using of the conduit assembly described above, the present invention has been made, in which the subject matter of the improvement, as obvious from the detailed description of the preferred embodiments thereof, consists in a resilient and plasto-resistant end anchor including the end portions of the wires exposed by peeling off the subject portion of the casing and being bent in the reverse direction along the length of the casing at an end of the conduit having an end portion of the inner tube cut in an appropriate length, and a holder made of synthetic resinous material injection molded about the end of the conduit for embedding the end portions of the wires in the holder to form the end anchor for preventing relative axial movement between the conduit and the holder.

In this specification, the term "plasto-resistant" is applied to the steel wires to mean the resistance to the plastic deformation of the steel wires.

According to a first specific feature of the present invention which is based upon the subject matter of the improvement mentioned above, the end portions of the steel wires embedded in the holder have reversely bent shape in order to remarkably increase the critical resistance against the pulling force above a predetermined intensity in the conduit assembly, said critical resistance resulting from the bonded connection between the conduit and the holder, and to elastically relax said pulling force, thereby preventing the steel wires embedded in the holder from effecting a slight sliding displacement when the conduit is repeatedly used to exert the pulling force of moderate intensity of the steel wires.

According to a second specific feature of the present invention, the end portions of the steel wires embedded in the holder are provided with a plurality of plasto-resistant bend points to make possible a further stronger resistance against the pulling force.

This was confirmed by the following experimental test.

Experimental Test

In order to demonstrate the difference of the resistance against the pulling force between the conduit assemblies according to the present invention and conventional one, those samples were used, in each of which a holder made of polyacetal and an outer casing of polypropylene have outer diameters of 10mm and 4mm respectively, and eight wires each having a diameter of 0.4mm are helically wound around an inner tube of synthetic resin, and the structures of which are shown in FIGS. 5–7 respectively.

Tests were carried out in such a manner that tensile load was applied to each sample at a speed of 10mm/min with its holder and outer casing held in a fixed position.

From the results obtained by the tests, it has been found out, as shown in a table given below, that the conduit assemblies according to the present invention show values more than 100kg of the resistance against the pulling force, which values are more than 2–4 times higher than that of the conventional conduit assembly.

Table

| | sample | resistance (kg) |
|---|---|---|
| conduit assemblies according to the present invention | conduit assembly having the triangular shaped steel wires (FIG. 6) | 125 |
| | conduit assembly having the rectangular shaped steel wires (FIG. 7) | 135 |
| conventional conduit assembly | conduit assembly having the flared steel wires | 50 |

What we claim is:

1. In a flexible conduit assembly including an elongated flexible conduit having an inner tube made of synthetic resinous material, a plurality of load-bearing wires wrapped helically about said inner tube on a long lead, a tubular outer casing made of synthetic resinous material enclosing said wires and said inner tube, and a flexible motion-transmitting wire core element supported within and extending through the bore of said inner tube; the improvement comprising:

the end portions of at least some of said wires being reversely bent wherein each of said reversely bent portions includes a first plasto-resistant bend point adjacent the end of the outer casing in which the end portion is bent through an angle of between 90° and 180° and a second plasto-resistant bend point between said first bend point and the end of the end portion which forms an included angle of greater than 90° whereby said end converges inwardly toward the axis of the conduit, and a holder made of synthetic resinous material injection molded about said end portions and said conduit for embedding said end portions of the wires in the holder to form a plasto-resistant end anchor for preventing relative axial movement between said conduit and said holder.

* * * * *